United States Patent
Chen

(10) Patent No.: US 10,100,975 B2
(45) Date of Patent: Oct. 16, 2018

(54) FIXTURE WITH FASTENING UNIT

(71) Applicant: Chin-Chu Chen, Taichung (TW)

(72) Inventor: Chin-Chu Chen, Taichung (TW)

( * ) Notice: Subject to any disclaimer, the term of this patent is extended or adjusted under 35 U.S.C. 154(b) by 0 days.

(21) Appl. No.: 15/255,162

(22) Filed: Sep. 2, 2016

(65) Prior Publication Data

US 2017/0082242 A1    Mar. 23, 2017

(30) Foreign Application Priority Data

Sep. 17, 2015   (TW) .............................. 104130801 A

(51) Int. Cl.
| F16B 2/02 | (2006.01) |
|---|---|
| F16M 13/02 | (2006.01) |
| B62J 15/02 | (2006.01) |
| F16B 2/08 | (2006.01) |

(52) U.S. Cl.
CPC ............ *F16M 13/022* (2013.01); *B62J 15/02* (2013.01); *F16B 2/08* (2013.01); *F16B 2/02* (2013.01); *Y10T 24/3427* (2015.01)

(58) Field of Classification Search
CPC .. F16B 2/08; F16B 2/02; F16M 13/022; B62J 15/02; Y10T 24/3427; Y10T 24/2143; Y10T 24/2147; Y10T 24/314; Y10T 24/37; Y10T 24/3703; Y10T 24/3768; Y10T 24/4012; Y10T 24/4047; Y10T 24/44; Y10T 24/44145
USPC ................................ 248/228.8, 74.3; 24/326
See application file for complete search history.

(56) References Cited

U.S. PATENT DOCUMENTS

| 5,416,952 | A | | 5/1995 | Dodge | |
|---|---|---|---|---|---|
| 5,745,959 | A | | 5/1998 | Dodge | |
| 5,938,155 | A | * | 8/1999 | Garland | ............... F16M 11/041 |
| | | | | | 248/177.1 |
| 7,367,522 | B2 | * | 5/2008 | Chen | ....................... A43C 7/00 |
| | | | | | 24/68 SK |
| 9,400,082 | B2 | * | 7/2016 | Webster | ............... F16M 13/022 |
| 9,700,101 | B2 | * | 7/2017 | Lovett | ...................... A43C 1/06 |
| 9,706,814 | B2 | * | 7/2017 | Converse | ............. A43C 11/165 |
| 2008/0196224 | A1 | | 8/2008 | Hu | |

(Continued)

FOREIGN PATENT DOCUMENTS

| CN | 201694521 U | 1/2011 |
|---|---|---|
| CN | 201718602 U | 1/2011 |

(Continued)

*Primary Examiner* — Nkeisha Smith
(74) *Attorney, Agent, or Firm* — CKC & Partners Co., Ltd.

(57) ABSTRACT

A fixture includes a main body and a fastening unit. The main body includes a passage and the fastening unit is disposed at the main body. The fastening unit includes a tension member and an adjusting member. The tension member includes a first end portion, a surrounding portion and a second portion. The first end portion is connected to the main body. The surrounding portion is connected to the first end portion and the second end portion. The second end portion is passed through the passage for forming a fastening space surrounded by the first end portion, the main body and the surrounding portion. The adjusting member disposed at the main body is coupled with the tension member and is rotated about an axis relative to the main body so as to adjust the fastening space. The axis passes through the main body but not the fastening space.

20 Claims, 15 Drawing Sheets

(56) References Cited

U.S. PATENT DOCUMENTS

| | | | |
|---|---|---|---|
| 2011/0265290 A1* | 11/2011 | Carnevali | F16B 2/08 24/326 |
| 2012/0018999 A1* | 1/2012 | Geese | F16L 21/065 285/337 |
| 2013/0047388 A1 | 2/2013 | Kavarsky | |
| 2013/0092780 A1 | 4/2013 | Soderberg | |
| 2014/0191095 A1* | 7/2014 | Le Gette | F16M 13/00 248/176.3 |
| 2017/0066385 A1* | 3/2017 | Dickinson | B60R 9/10 |
| 2017/0096841 A1* | 4/2017 | Hall | B60R 25/02136 |
| 2017/0122459 A1* | 5/2017 | Haynes | F16L 3/1058 |

FOREIGN PATENT DOCUMENTS

| | | |
|---|---|---|
| CN | 104023579 A | 9/2014 |
| CN | 203952623 U | 11/2014 |
| CN | 204213119 U | 3/2015 |
| JP | 2001218340 A | 8/2001 |
| WO | 2014036471 A2 | 3/2014 |

\* cited by examiner

FIXTURE WITH FASTENING UNIT

RELATED APPLICATIONS

This application claims priority to Taiwan Application Serial Number 104130801, filed Sep. 17, 2015, which is herein incorporated by reference.

BACKGROUND

Technical Field

The present disclosure relates to a fixture. More particularly, the present disclosure relates to a fixture for securing an article onto targets with different sizes.

Description of Related Art

It is a common fixing method that using a thread or a lace passing through an article and attaching the article onto a target to tight the thread or lace for securing the article. Because the length of the thread or lace is adjustable, the target can be a supporting frame of a bike or other frames with different sizes and shapes. Hence, the application of the thread and the lace are very wide. However, the article is easily released and cannot be fixed for a long time due to the loosening of the thread or the lace. Thus, a fixing belt is developed, such as a tie-wrap. Through engaging a tooth of the fixing belt into an engaging portion of the fixing belt to adjust the length of the fixing belt, the fixing belt can fit the size of the target so as to secure the article. The fixing belt can only be used one time because the tooth cannot release from the engaging portion after engaging. The fixing belt needs to be cut off before releasing the article. As a result, it is inconvenient.

Furthermore, if the target is a supporting frame of a bike, vibration occurs during riding the bike; therefore, the fixing belt cannot secure on the supporting frame due to lack of engaging force, and the article may fall down or loosen owing to shaking condition.

Another fixture is developed, which includes a C-shaped member and a threading device. The threading device is connected to both two ends of the C-shaped member. With the threading action of the threading device, the C-shaped member can be pushed against the target to secure the article. Because the C-shaped member can be pushed against the target continuously, the securing ability is greater and the article will not easily release from the target during a vibrating environment.

However, the C-shaped member and the threading device of the above mentioned fixture have limited sizes, and they cannot fit targets with different sizes. In addition, the C-shaped member merely suit tube-type target. Once the shape of the target is changed, the fixture cannot be applied any more. Hence, such kind of fixture is lack of using diversity. Moreover, the threading device is heavy, and the securing ability of metal is too large. If the fastening power is over loading, the target will be damaged or the C-shaped member will be deformed. Furthermore, if the fastening power is small, the securing ability is not enough and brings much inconvenience.

Base on the aforementioned problem, how to increase the using diversity and convenience of the fixture and give the fixture better securing ability become a pursuit target for practitioners.

SUMMARY

The present disclosure provides a fixture which includes a main body and a fastening unit. The main body includes a passage and the fastening unit is disposed at the main body. The fastening unit includes a tension member and an adjusting member. The tension member includes a first end portion, a surrounding portion and a second portion. The first end portion is connected to the main body. One end of the surrounding portion is connected to the first end portion. The second end portion, which is connected to the other end of the surrounding portion, is passed through the passage for forming a fastening space surrounded by the first end portion, the main body and the surrounding portion. The adjusting member disposed at the main body is coupled with the tension member and is rotated about an axis relative to the main body so as to adjust the fastening space. The axis passes through the main body but not the fastening space.

The present disclosure provides a fixture which is for fixing an article on a target includes a main body, a fastening unit and a connecting unit. The main body includes a passage and a fastening unit is disposed at the main body.

The fastening unit includes a tension member and an adjusting member. The tension member includes a first end portion, a surrounding portion and a second portion. The first end portion is connected to the main body. One end of the surrounding portion is connected to the first end portion. The second end portion, which is connected to the other end of the surrounding portion, is passed through the passage to surround the target with the first end portion, the main body and the surrounding portion. The adjusting member disposed at the main body is coupled with the tension member and is rotated about an axis relative to the main body so as to secure the tension member onto the target. One end of the connecting unit is disposed at the main body which is connected to the article. The axis passes through the main body but not the target.

The present disclosure provides a fixture which is applied on a supporting frame of a bike includes a main body and a fastening unit. The main body includes a passage and a part of the main body is made of a tough material. The fastening unit disposed at the main body includes a tension member and an adjusting member. The tension member includes a first end portion, a surrounding portion and a second portion. The first end portion is connected to the main body. One end of the surrounding portion is connected to the first end portion. The second end portion, which is connected to the other end of the surrounding portion, is passed through the passage to surround the supporting frame of the bike with the first end portion, the main body and the surrounding portion. The adjusting member disposed at the main body is coupled with the tension member and is rotated about an axis relative to the main body so as to secure the tension member onto the supporting frame of the bike. The axis passes through the main body but not the supporting frame of the bike.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
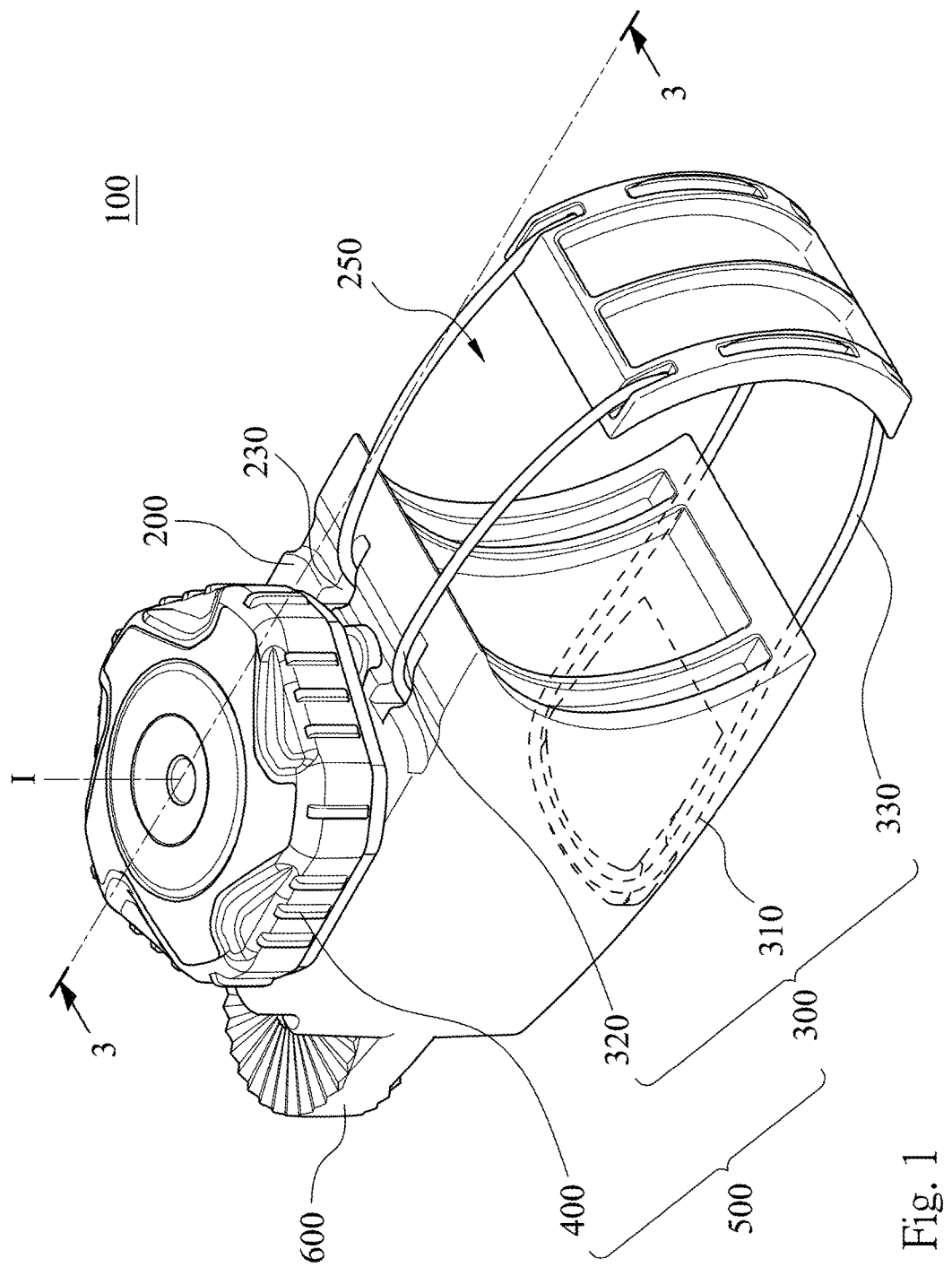
FIG. 1 shows a schematic view of a fixture according to one embodiment of the present disclosure.

Please refer to FIG. 1. FIG. 1 shows a schematic view of a fixture 100 according to one embodiment of the present disclosure. The fixture 100 includes a main body 200 and a fastening unit 500. The main body 200 includes a passage 230 and the fastening unit 500 is disposed at the main body 200. The fastening unit 500 includes a tension member 300 and an adjusting member 400. The tension member 300 includes a first end portion 310, a surrounding portion 330 and a second end portion 320. The first end portion 310 is connected to the main body 200. A proximate end 331 (shown in FIG. 3) of the surrounding portion 330 is connected to the first end portion 310. The second end portion 320, which is connected to a distal end 332 (shown in FIG. 3) of the surrounding portion 330, is passed through the passage 230 for forming a fastening space 250 surrounded by the first end portion 310, the main body 200 and the surrounding portion 330. The adjusting member 400 disposed at the main body 200 is coupled with the tension member 300 and is rotated about an axis I relative to the main body 200 so as to adjust the fastening space 250. The axis I passes through the main body 200 but not the fastening space 250.

Therefore, based on the structural arrangement of the main body 200 and the fastening unit 500, the fastening space 250 of the fixture 100 can be adjusted. Moreover, because the axis I of the adjusting member 400 passes through the main body 200 but not the fastening space 250, the adjusting stress of the adjusting member 400, when fastening or loosening the tension member 300, is more balance. The life time of the fixture 100 can be increased. The detail structure and operating method of the fixture 100 will be described in the following paragraphs.

Figure 2A:
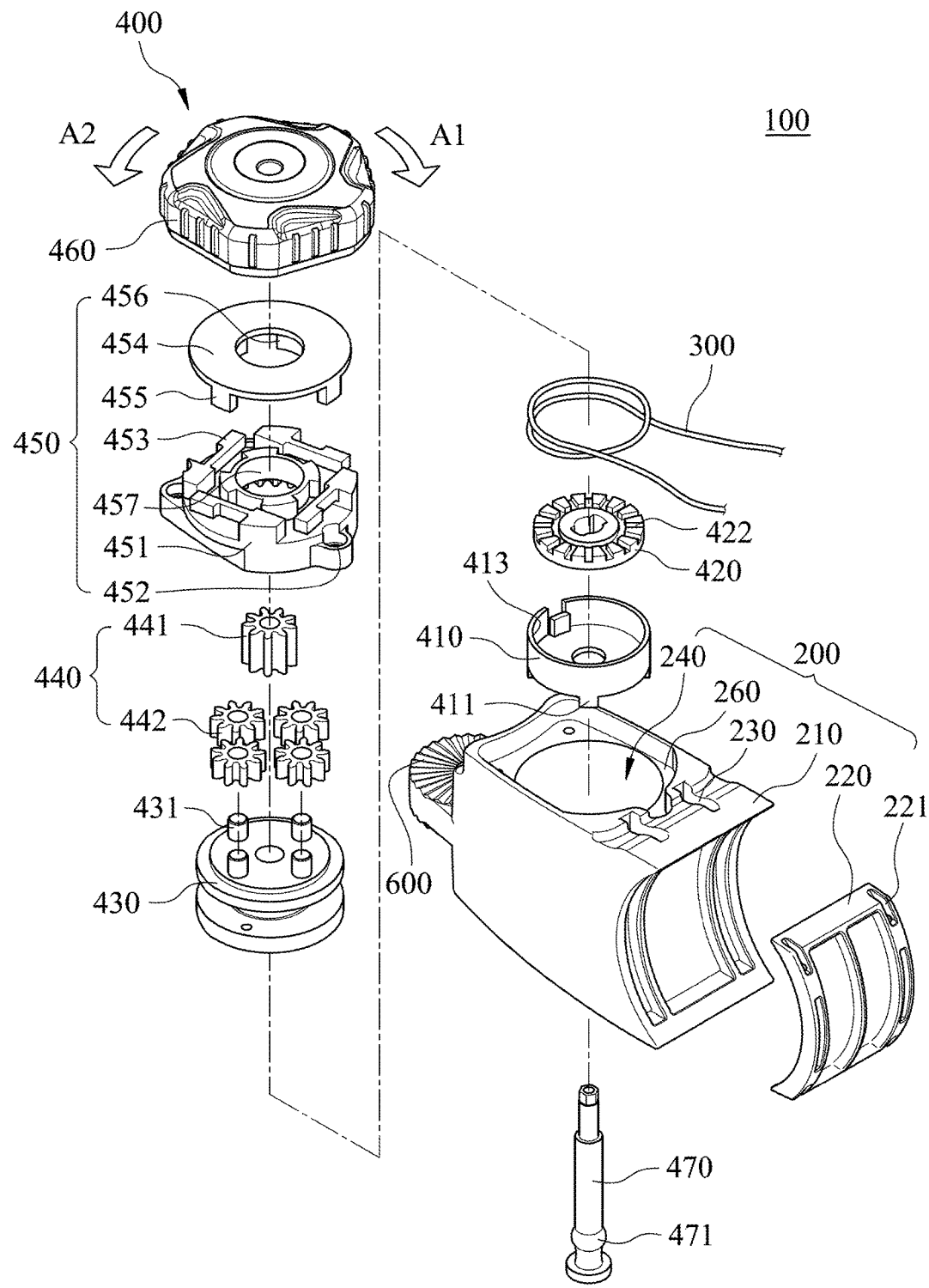
FIG. 2A shows an exploded view of the fixture of FIG. 1.
Figure 2B:
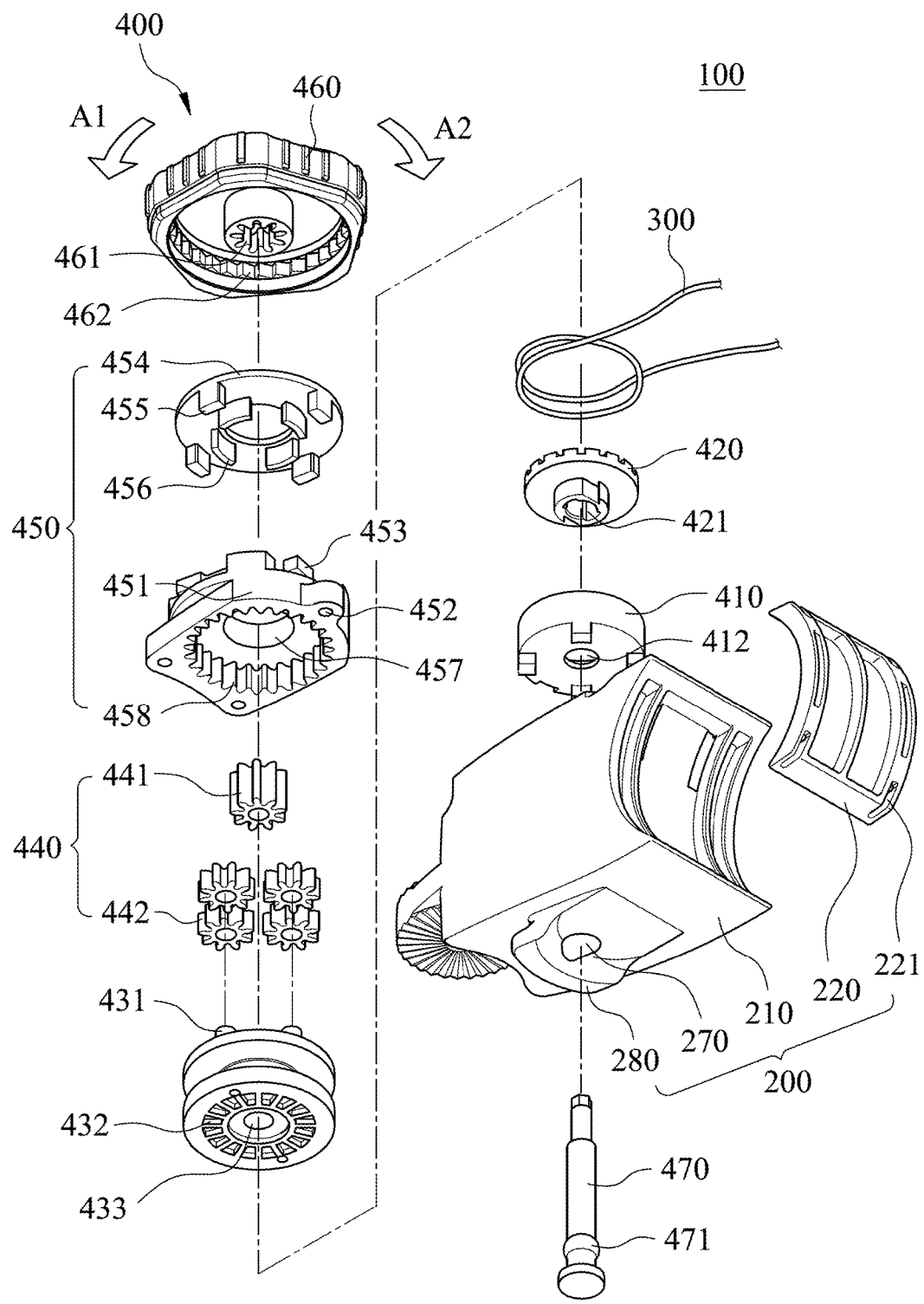
FIG. 2B shows another exploded view of the fixture of FIG. 1.
Figure 3:
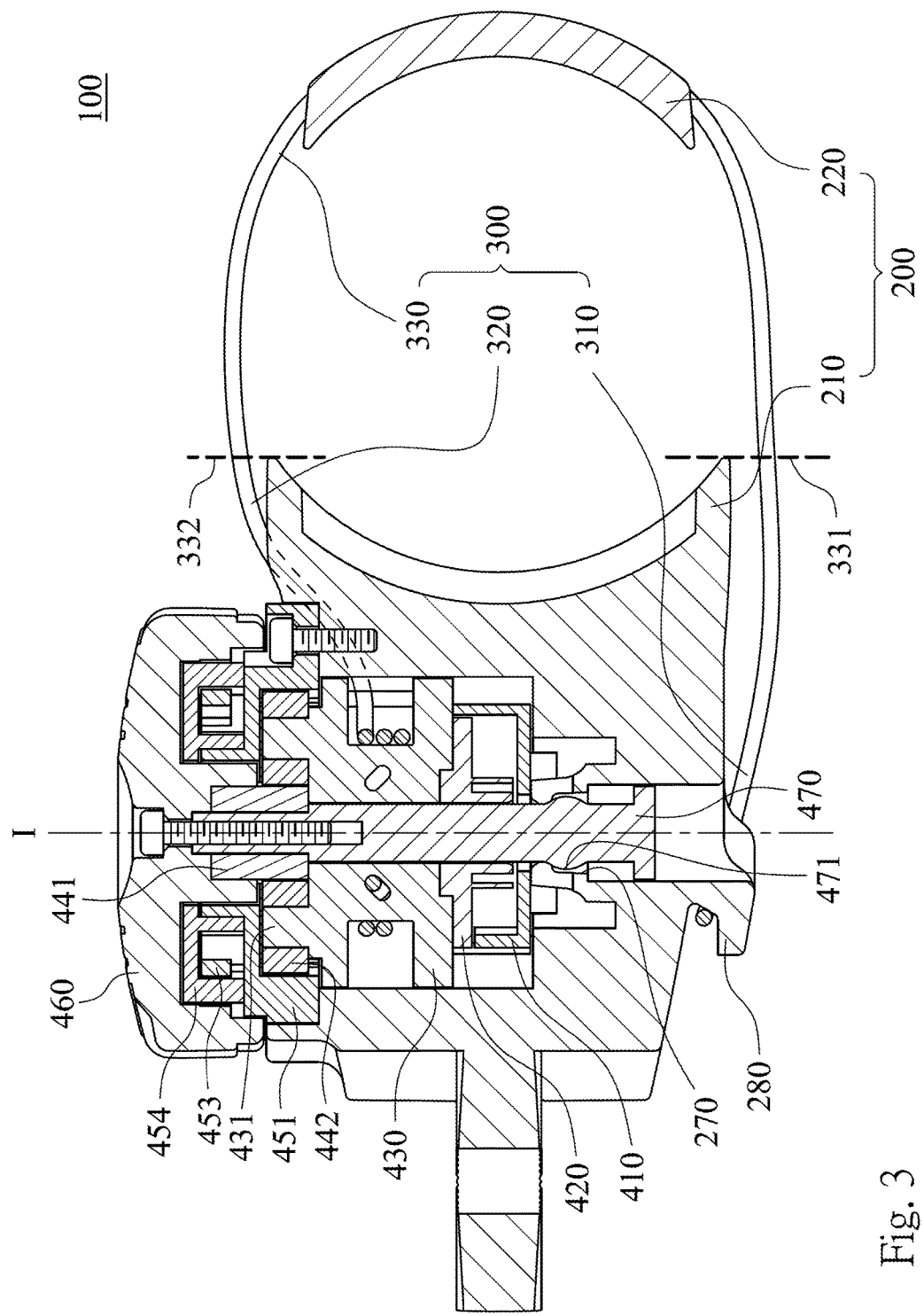
FIG. 3 shows a cross-sectional view of the fixture taken along line 3-3 of FIG. 1.

Please refer to FIGS. 2A, 2B and 3. FIG. 2A shows an exploded view of the fixture 100 of FIG. 1. FIG. 2B shows another exploded view of the fixture 100 of FIG. 1. FIG. 3 shows a cross-sectional view of the fixture 100 taken along line 3-3 of FIG. 1.

The main body 200 includes a fixing member 210, an arc member 220, a receiving space 240, a flat surface 260, two passages 230, a hole 270 (shown in FIG. 2B) and a lip 280 (shown in FIG. 2B). The arc member 220 and the fixing member 210 are isolated and spaced from each other. The receiving space 240 and the passages 230 are disposed at the fixing member 210, and the passages 230 are communicated with the receiving space 240. The hole 270 is also communicated with the receiving space 240. The lip 280 is protruded from the fixing member 210 and is for connected to the first end portion 310 (shown in FIG. 3). In this embodiment, the fixing member 210 is made of a tough material and has rigidity. The hardness of the tough material is larger than 50D. If the fixing member 210 is made of non-tough material, the fixing member 210 will has insufficient security when secure on a target. The arc member 220 is made of soft material to be deformed corresponding to the target secured. One end of the fixing member 210, which is faced toward the arc member 220, is arc-shaped to correspond to the shape of the arc member 220, and the arc member 220 is connected to the surrounding portion 330 (shown in FIG. 3). In the embodiment of FIG. 2A, the arc member 220 includes two grooves 221, and the surrounding portion 330 is disposed in the grooves 221. In addition, the fixture 100 further includes a connecting unit 600 disposed at the main body 200. The connecting unit 600 and the main body 200 are formed integrally.

The adjusting member 400 includes a base 410, a linking plate 420, a spool 430, a planetary gear set 440, a clasping portion 450, and a knob 460. The base 410 is disposed inside the receiving space 240 and includes four protrusions 411, a hollow 413 and a round hold 412 (shown in FIG. 2B). The receiving space 240 includes four caves (not shown) corresponding to the protrusions 411. Hence, when the protrusions 411 are engaged with the caves, the base 410 can be secured in the receiving space 240 and cannot be rotated relative to the receiving space 240.

The linking plate 420 is disposed inside the hollow 413 of the base 410 and can be rotated relative to the base 410. The linking plate 420 includes a penetrating hole 421 (shown in FIG. 2B) and an annular protruding tooth 422. The spool 430 is disposed in the receiving space 240 and includes four pivotal rods 431, an inner tooth 432 (shown in FIG. 2B) and a circular hole 433 (shown in FIG. 2B). The inner tooth 432 is engaged with annular protruding tooth 422.

The tension member 300 is wound around the spool 430 to be fastened or loosened by the rotation of the spool 430. In the embodiment, the tension member 300 is a lace. As shown in FIG. 3, the first end portion 310, the second end portion 320 and the surrounding portion 330 are integrally formed; hence, the proximate end 331 and the distal end 332 described herein are virtual ends designated by broken lines.

The planetary gear set 440 includes a sun gear 441 and four planetary gears 442. Each of the planetary gears 442 is disposed at each pivotal rod 431. The sun gear 441 is disposed at the knob 460. The sun gear 441 is engaged with the planetary gears 442 at an operating state and is disengaged from the planetary gears 442 at another operating state. It will be described in detail in the following paragraphs.

The clasping portion 450 is disposed at the flat surface 260 and includes an engaging plate 451 and an engaging ring 454. The engaging plate 451 includes four arms 453, three screwing holes 452, a communicating hole 457 (shown in FIG. 2B) and an inner annular tooth 458 (shown in FIG. 2B). The inner annular tooth 458 is engaged with the four planetary gears 442 so that the planetary gears 442 can be rotated relative to the inner annular tooth 458. The engaging ring 454 includes four outer protruding portions 455 and four inner protruding portions 456. The engaging ring 454 can be engaged with the engaging plate 451 through engaging the engaging plate 451 with the outer protruding portions 455 and the inner protruding portions 456.

The knob 460 is a cover and includes a first tooth 461 (shown in FIG. 2B) and a second tooth 462 (shown in FIG. 2B). The first tooth 461 is for engaging with the sun gear 441 and the second tooth 462 is coordinated with the arms 453. The arms 453 can abut against the second tooth 462 so as to prevent the knob 460 from rotating with respect to the arms 453 along a loosening direction A2. The arms 453 are disengaged from the second tooth 462 along a fastening direction A1 so as to allow the knob 460 to be rotated relative to the arms 453.

In addition, the adjusting member 400 further includes a moving portion 470. The moving portion 470 is rod-shaped and includes an engaging portion 471. One end of the moving portion 470 is passed through the receiving space 240, the round hole 412, the penetrating hole 421, the circular hole 433 and the communicating hole 457 to position at the knob 460. The sun gear 441 is sleeved on the moving portion 470.

To be more specific, during the assembling process, the base 410 is disposed and secured in the receiving space 240 first. Then the linking plate 420 is positioned into the hollow 413 of the base 410 and the spool 430 is positioned into the receiving space 240. Moreover, each of the planetary gears 442 is positioned at each of the pivotal rods 431. Three screws (not shown) are adopted to be passed through each of the screwing holes 452 to secure the engaging plate 451 on the flat surface 260. The moving portion 470 is then inserted, and the sun gear 441 is sleeved on the moving portion 470 to engage with the knob 460 and the planetary gears 442. Finally, a screwing member (not show) is adopted to secure the knob 460 and the moving portion 470.

Figure 4A:
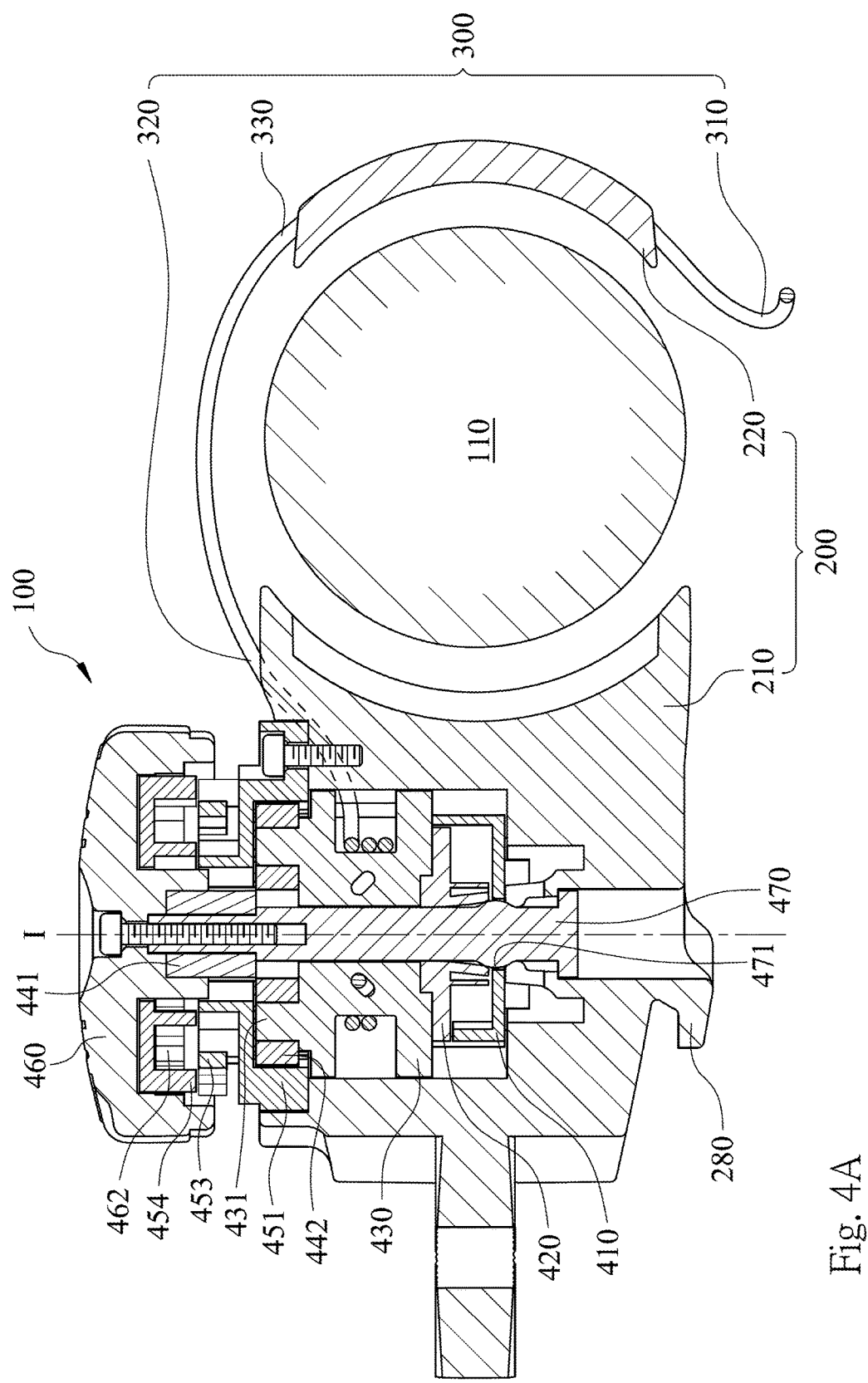
FIG. 4A shows a cross-sectional view of the fixture of FIG. 1 applied on a target.
Figure 4B:
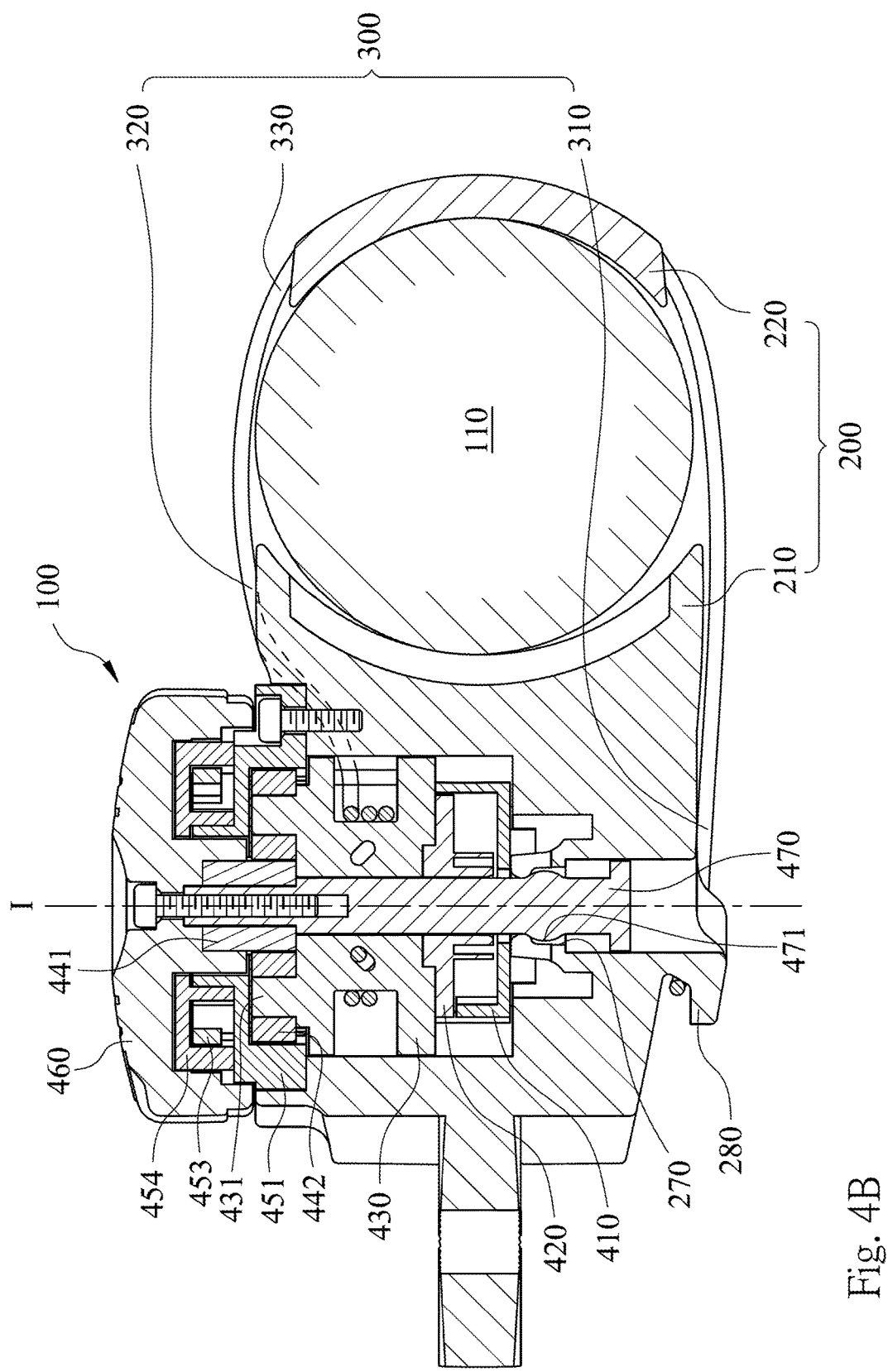
FIG. 4B shows another cross-sectional view of the fixture of FIG. 1 applied on the target.

Please refer to FIG. 4A and FIG. 4B. FIG. 4A shows a cross-sectional view of the fixture 100 of FIG. 1 applied on a target 110. FIG. 4B shows another cross-sectional view of the fixture 100 of FIG. 1 applied on the target 110. When the knob 460 is moved along the axis I, the moving portion 470 will be moved between a first position and a second position. As shown in FIG. 4A, when the knob 460 is pulled upward along the axis I, the moving portion 470 will be moved upward to engage the engaging portion 471 with the round hole 412 and the penetrating hole 421 so as to move the sun gear 441 along the axis I to release the planetary gears 442, and the moving portion 470 is at the first position. Thus, the arms 453 is released from the second tooth 462, and the arms 453 are not interfered by the knob 460, that is, the arms 453 can freely rotate to allow the spool 430 to rotate without limitation.

When the fixture 100 is used to secure a target 110, the first end portion 310 can be released from the lip 280. Because the spool 430 can be rotated without limitation, the length of the tension member 300 can be adjusted to correspond to the size of the target 110. Therefore, pulling the first end portion 310 of the tension member 300 can rotate the spool 430 to release the tension member 300. When the length of the tension 300 is long enough, the tension member 300 can surround the target 110.

As shown is FIG. 4B, when the tension member 300 surrounds the target 110, the first end portion 310 can be engaged with the lip 280 to connect the first end portion 310 to the main body 200. The knob 460 can be pressed downward along the axis I to move the moving portion 470 downward to engage the engaging portion 471 with the hole 270, and the moving portion 470 is at the second position.

When the moving portion 470 is at the second position, the arms 453 are engaged with second tooth 462. The sun gear 441 is engaged with planetary gears 442. As described above, the arms 453 release from the second tooth 462 along the fastening direction A1 (shown in FIG. 2B), and the knob 460 is rotated relative to the arms 453. Consequently, when the knob 460 is rotated along the fastening direction A1, the sun gear 441 is linked by the knob 460 to rotate. Because the engaging plate 451 is secured on the flat surface 260 of the main body 200, the engaging plate 451 can be deemed as a fixed ring gear; thus, the planetary gears 442 forced by the sun gear 441 and the spool 430 is linked by the planetary gears 442 to rotate relative to the engaging plate 451. Consequently, the second end portion 320 is wound by the spool 430 to adjust the fastening space 250, and the fixing member 210, the surrounding portion 330 and the arc member 220 are pushed against the target 110.

Because the arms 453 will abut against the second tooth 462 along the loosening direction A2 so as to prevent the knob 460 from rotating relative to the arms 453, the arms 453 will prohibit the tension member 300 from loosening along the loosening direction A2 to achieve a goal of securing the target 110 after the fixing member 210, the surrounding portion 330 and the arc member 220 are pushed against the target 110.

Figure 5:
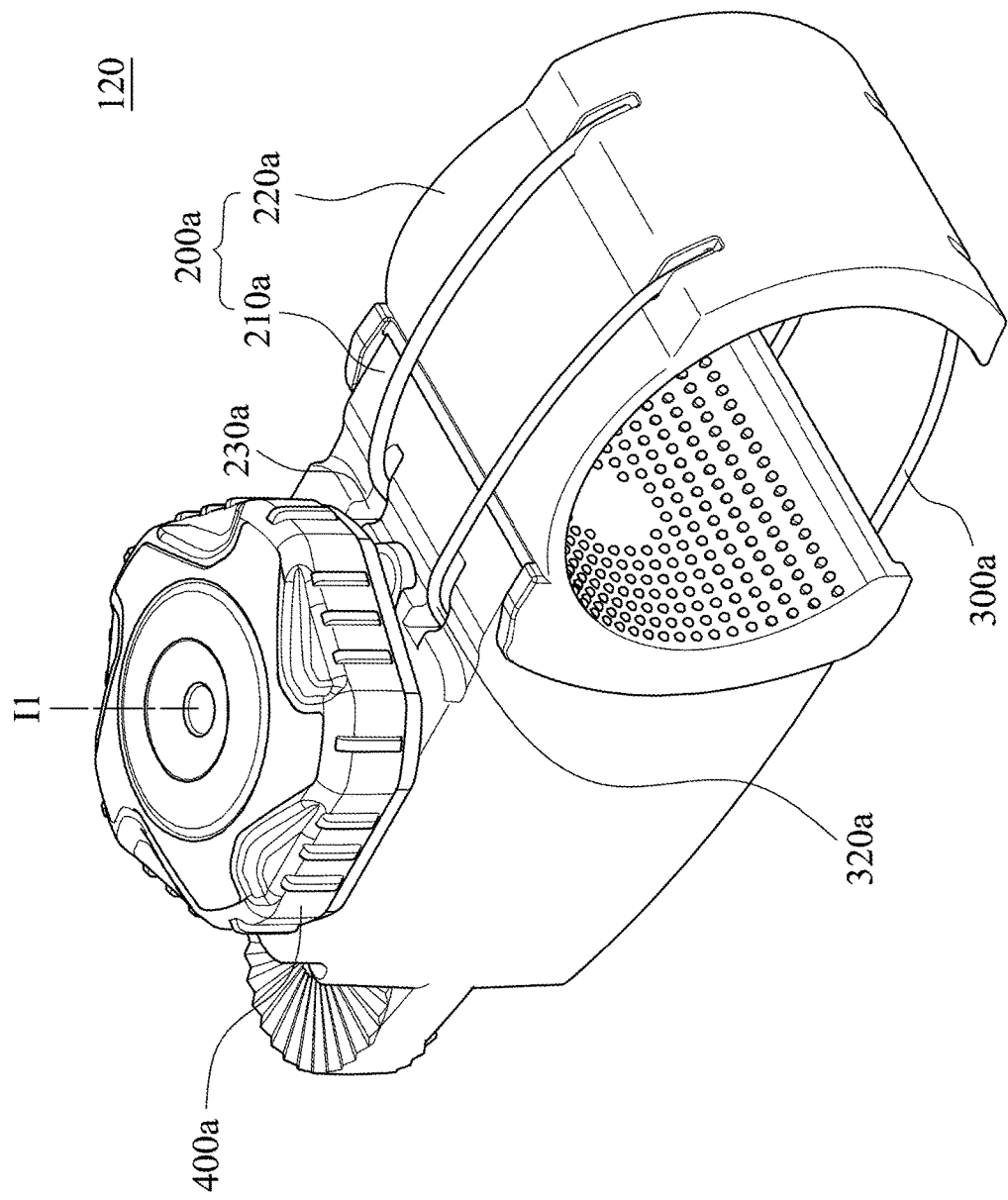
FIG. 5 shows a schematic view of a fixture according to another embodiment of the present disclosure.
Figure 6:
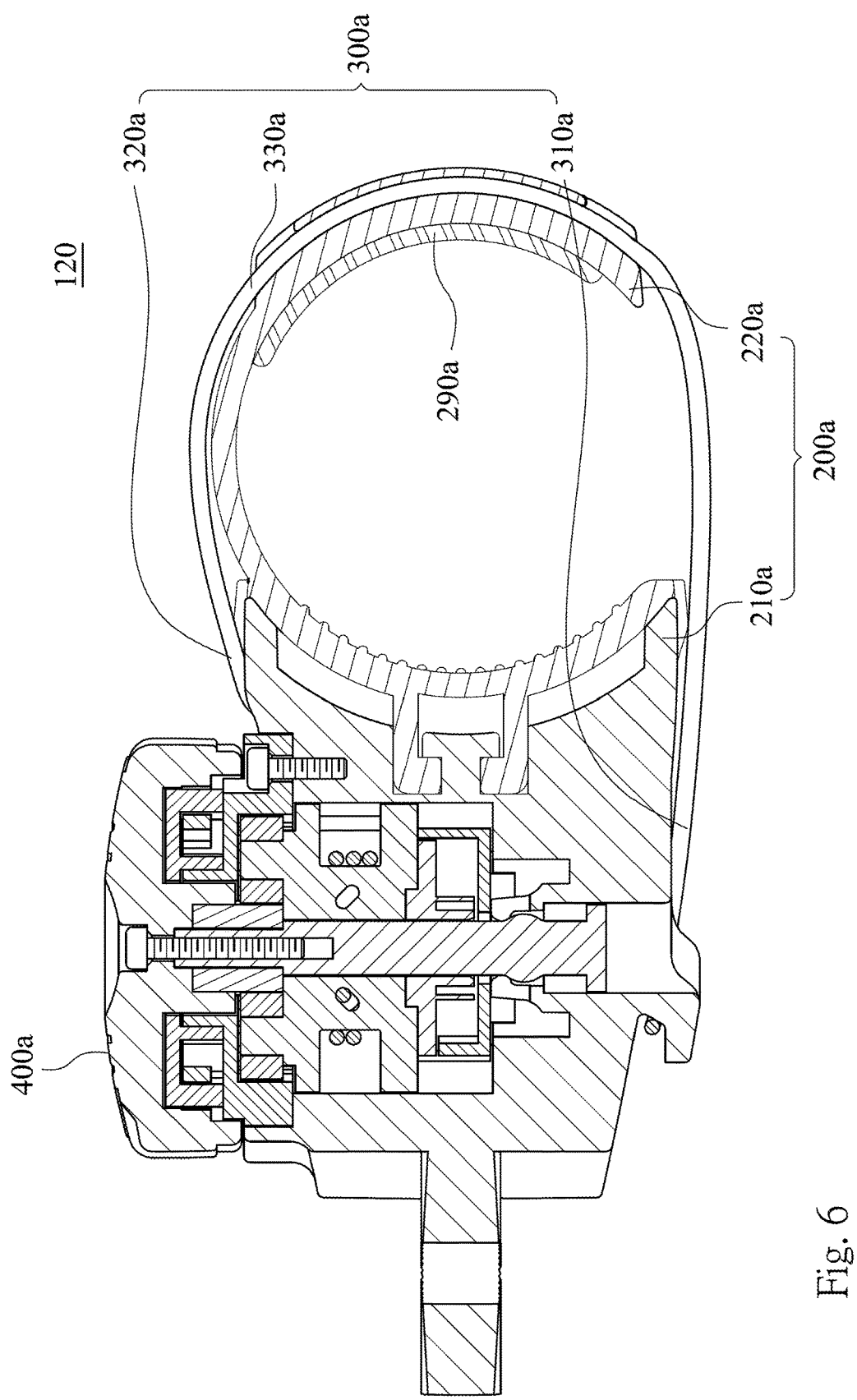
FIG. 6 shows a cross-sectional view of the fixture of FIG. 5.

Please refer to FIGS. 5 and 6. FIG. 5 shows a schematic view of a fixture 120 according to another embodiment of the present disclosure. FIG. 6 shows a cross-sectional view of the fixture 120 of FIG. 5. The basic structure of the fixture 120 is similar to the embodiment described in FIG. 1 to FIG. 4B, but the structure of the main body 200a is different. The main body 200a includes a fixing member 210a and a C-shaped member 220a which is detachably disposed at the main body 200a. The surrounding portion 330a of the tension member 300a is connected to the C-shaped member 220a, and the second end portion 320a is passed into the passages 230a. The first end portion 310a is connected to the main body 200a, and the adjusting member 400a is rotated about the axis I1 relative to the main body 200a so as to adjust the length of the tension member 300a to allow the C-shaped member 220a to push against a target (not shown). The operation method is similar to the embodiment described in FIG. 1 to FIG. 4B and will not described hereafter.

In the embodiment, the main body 200a can further include a spacer 290a disposed at an inner side of C-shaped member 220a. The spacer 290a is flexible to prevent from damaging the target while securing the target.

Figure 7:
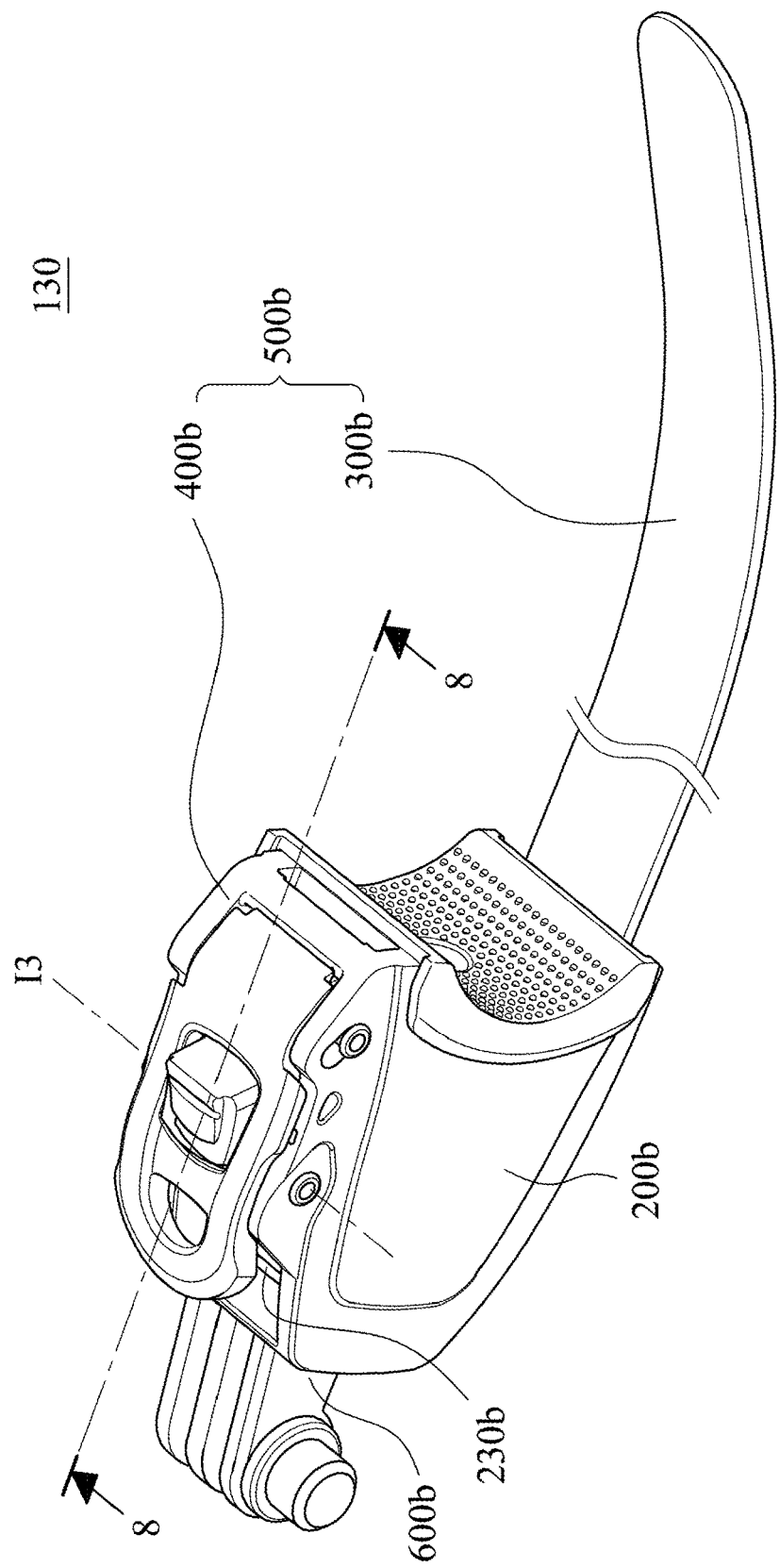
FIG. 7 shows a schematic view of a fixture according to further another embodiment of the present disclosure.

Please refer to FIG. 7. FIG. 7 shows a schematic view of a fixture 130 according to further another embodiment of the present disclosure. The fixture 130 includes a main body 200b, a fastening unit 500b and a connecting unit 600b. The main body 200b includes a passage 240b (shown in FIG. 9). The fastening unit 500b is disposed at the main body 200b and includes a tension member 300b and an adjusting member 400b. The connecting unit 600b is disposed at the main body 200b.

Figure 8:
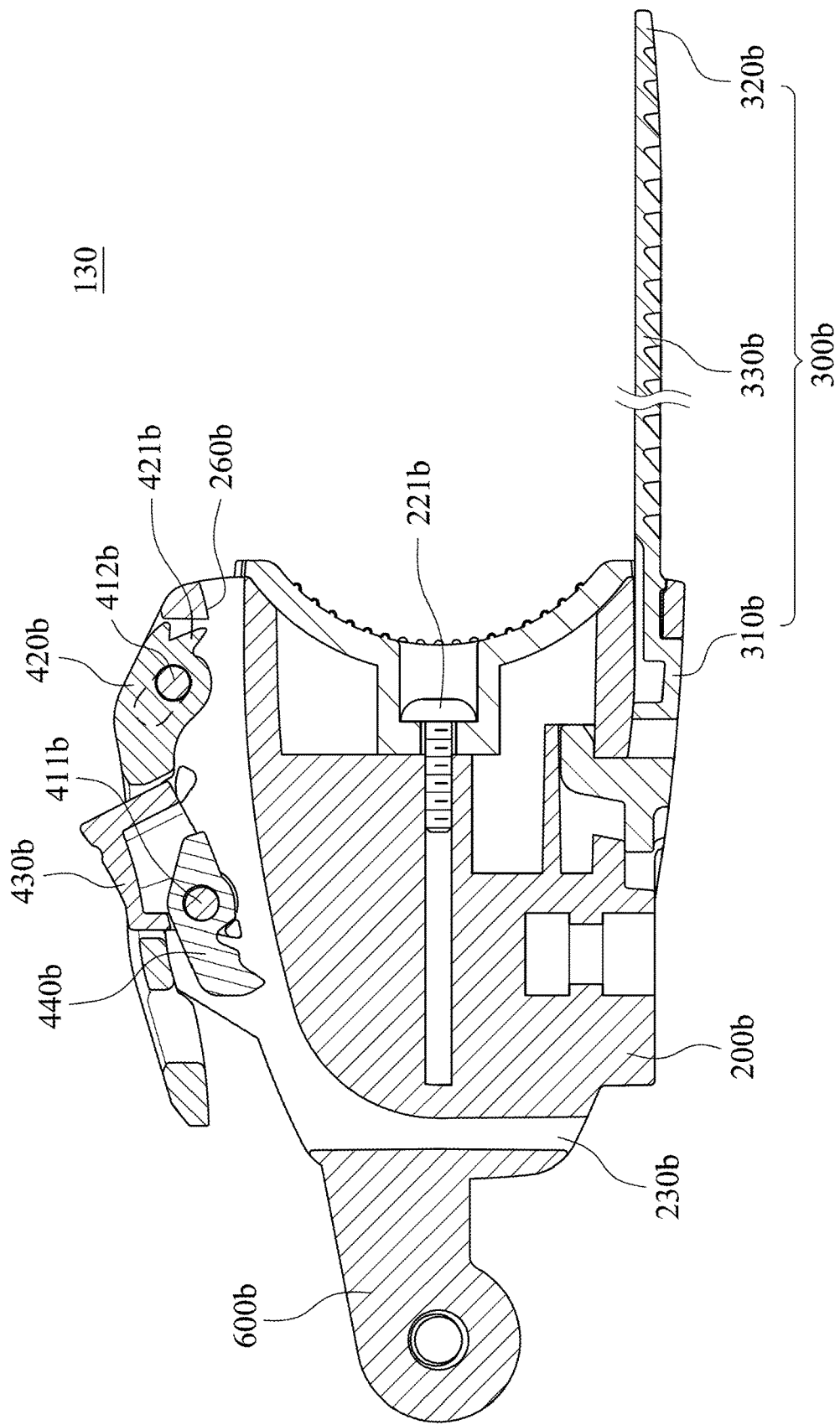
FIG. 8 shows a cross-sectional view of the fixture taken along line 8-8 of FIG. 7.
Figure 9:
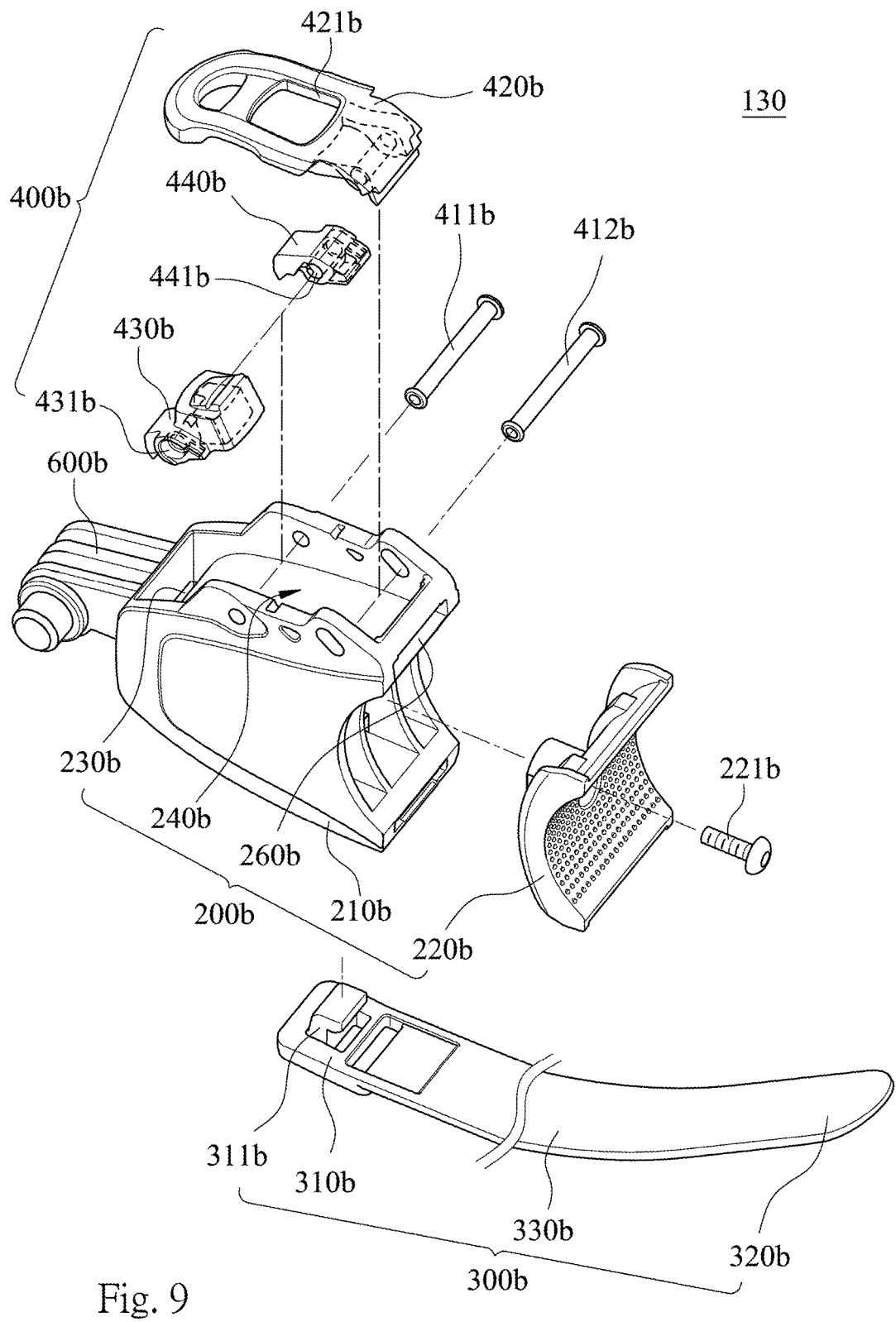
FIG. 9 shows an exploded view of the fixture of FIG. 7.

Please refer to FIG. 8 and FIG. 9. FIG. 8 shows a cross-sectional view of the fixture 130 taken along line 8-8 of FIG. 7. FIG. 9 shows an exploded view of the fixture 130 of FIG. 7.

In addition to the passage 240b, the main body 200b further includes a fixing member 210b, an abutting member 220b, a through hole 230b and an opening 260b. The abutting member 220b is detachably disposed at the fixing member 210b with a screw 221b. The through hole 230b, the passage 240b and the opening 260b are disposed at the main body 200b and the passage 240b is communicated with the opening 260b.

The adjusting member 400b includes a pivotal rod 411b, a pin rod 412b, a pulling portion 420b, a pressing portion 430b and a linking portion 440b. The pulling portion 420b is pivotally disposed at the fixing member 210b and includes an aperture 421b. The pressing portion 430b includes a first pivotal hole 431b, and the linking portion 440b includes a second pivotal hole 441b. The pivotal rod 411b is passed through the first pivotal hole 431b and the second pivotal hole 441b to dispose the pressing portion 430b and the linking portion 440b on the fixing member 210b. The pressing portion 430b is exposed from the aperture 421b to be pressed by a user. The pressing portion 430b is linked with the linking portion 440b.

The tension member 300b includes a first end portion 310b, a surrounding portion 330b and a second end portion 320b. The first end portion 310b includes a hook 311b, and the first end portion 310b is connected to the main body 200b with the hook 311b. One end of the surrounding portion 330b is connected to the first end portion 310b and the other end of the surrounding portion 330b is connected to the second end portion 320b. The tension member 300b further includes a plurality of teeth (not labeled). In this embodiment, the tension member 300b is a gear bar, and the first end portion 310b, surrounding portion 330b and the second end portion 320b are formed integrally.

Figure 10A:
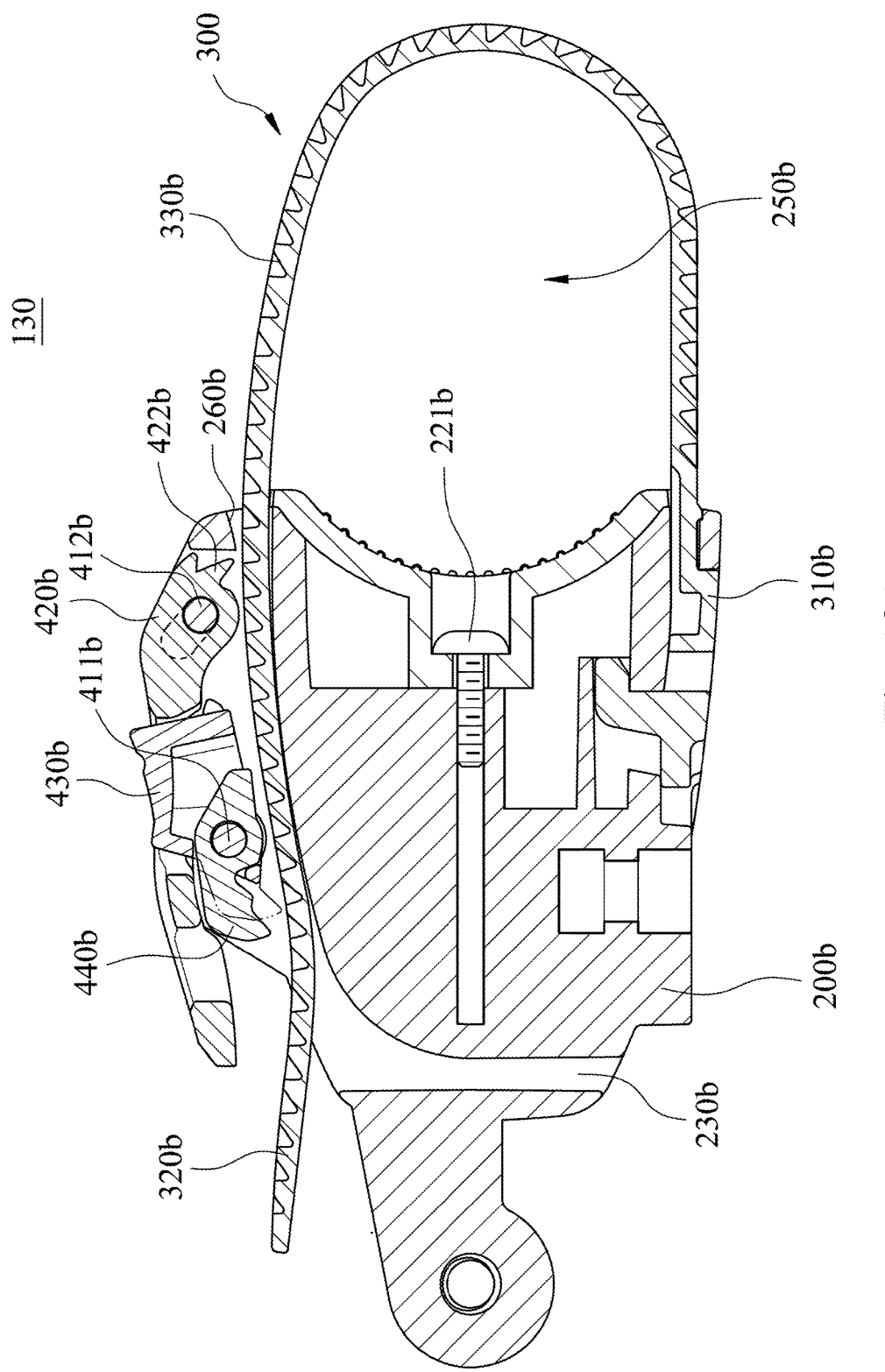
FIG. 10A shows a cross-sectional view of the fixture of FIG. 7 at one state.
Figure 10B:
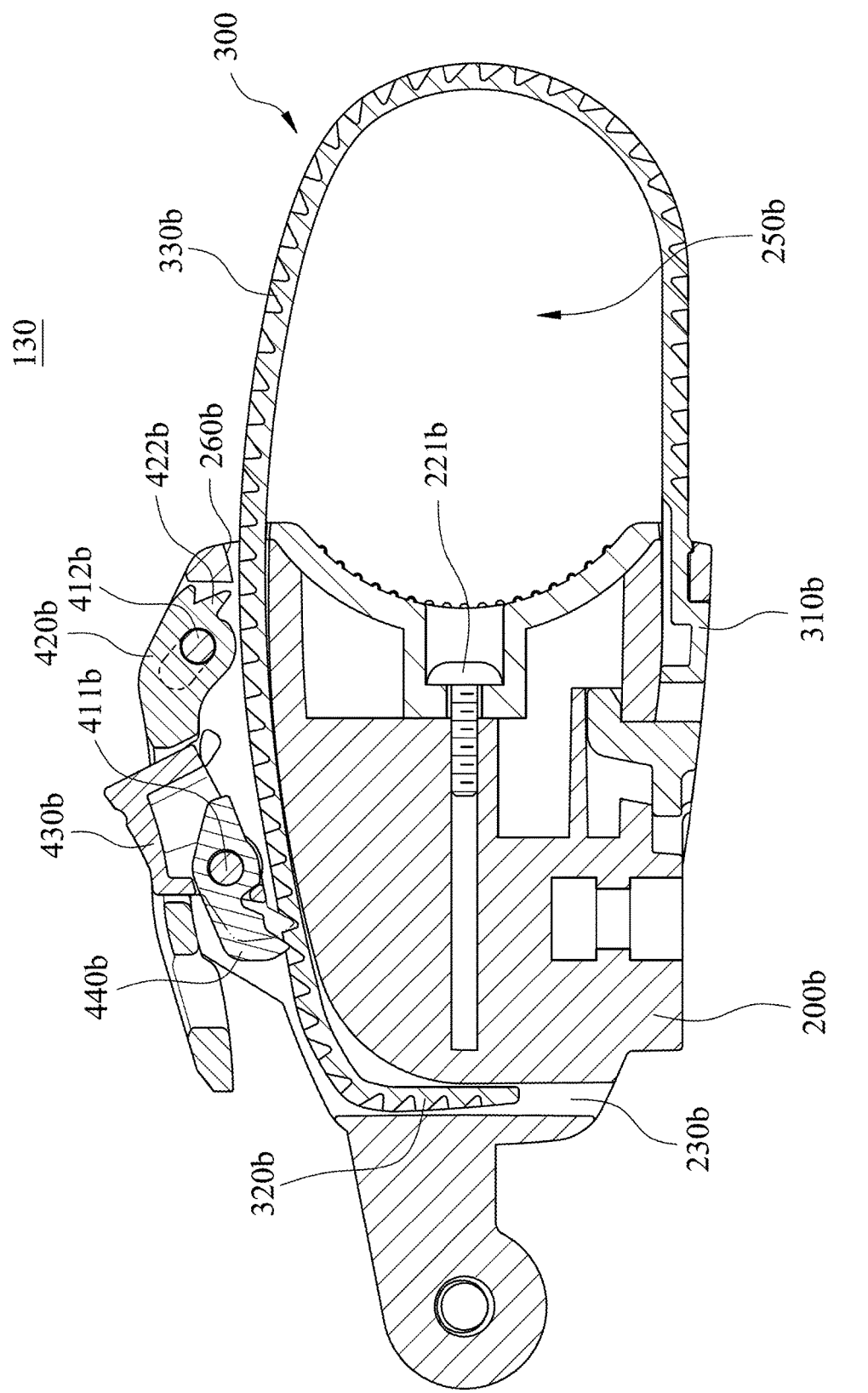
FIG. 10B shows a cross-sectional view of the fixture of FIG. 8 at another state.

Please refer to FIGS. 10A and 10B. FIG. 10A shows a cross-sectional view of the fixture 130 of FIG. 7 at one state. FIG. 10B shows a cross-sectional view of the fixture 130 of FIG. 8 at another state. The pressing portion 430b is rotated about the axis 13 (shown in FIG. 7) relative to the main body 200b and has a first position and a second position relative to the main body 200b. As shown in FIG. 10A, the pressing portion 430b is at the first position, and the second end portion 320b can be passed through the opening 260b to go into the passage 240b (shown in FIG. 9) to form a fastening space 250b. As shown in FIG. 10B, the pressing portion 430b is at the second position and is engaged with the teeth to pressing the tension member 300b so as to fix the fastening space 250b.

In addition, the second end portion 320b will pass through the through hole 230b after passing through the passage 240b to prevent from interfering the connecting unit 600b. As shown in FIG. 10B, the second end portion 320b hides inside the main body 200b after passing through the through hole 230b. However, the second end portion 320b can exposed outside of the main body 200b after passing through the through hole 230b and it will not be limited thereto.

In this embodiment, the pulling portion 420b is rotated about the pin rod 412b relative to the main body 200b and further includes a protruding tooth 422b. When the pulling portion 420b is pulled upward, the pressing portion 430b will be linked by the pulling portion 420b to move to the first position and the protruding tooth 422b is engaged with the teeth of the tension member 300b. Through operating the pulling portion 420b upward and downward, the tension member 300b can be moved to adjust the fastening space 250b.

Figure 11:
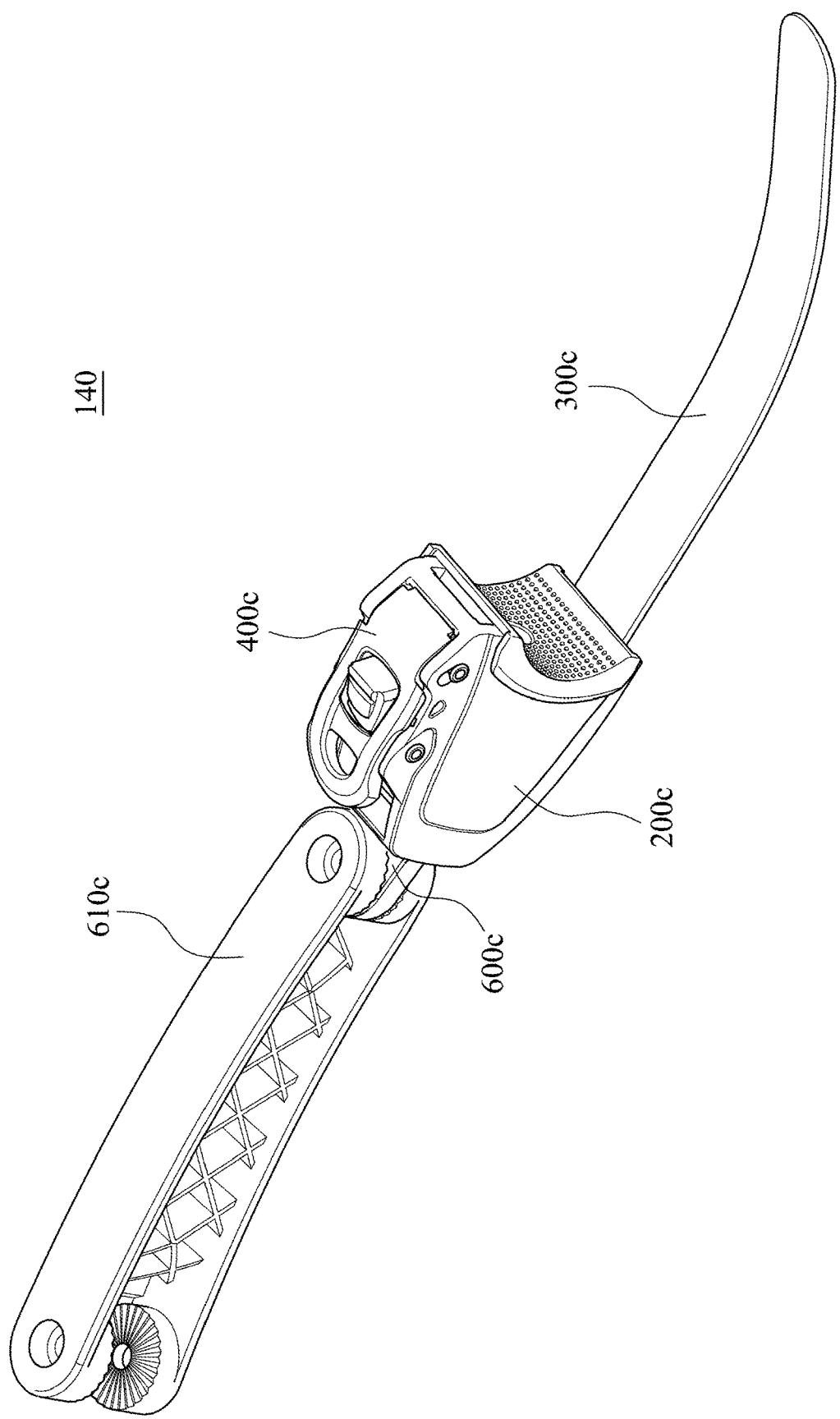
FIG. 11 shows a schematic view of a fixture according to yet another embodiment of the present disclosure.

Please refer to FIG. 11. FIG. 11 shows a schematic view of a fixture 140 according to yet another embodiment of the present disclosure. The fixture 140 includes a main body 200c, a tension member 300c, an adjusting member 400c and a connecting unit 600c. The structure of the main body 200c, the tension member 300c and the adjusting member 400c is similar to the embodiment described in FIG. 7 to FIG. 10B and will not be described hereafter. The connecting unit 600c is disposed at the main body 200c and is expansively connected to a connecting member 610c to increase the using diversity.

Figure 12:
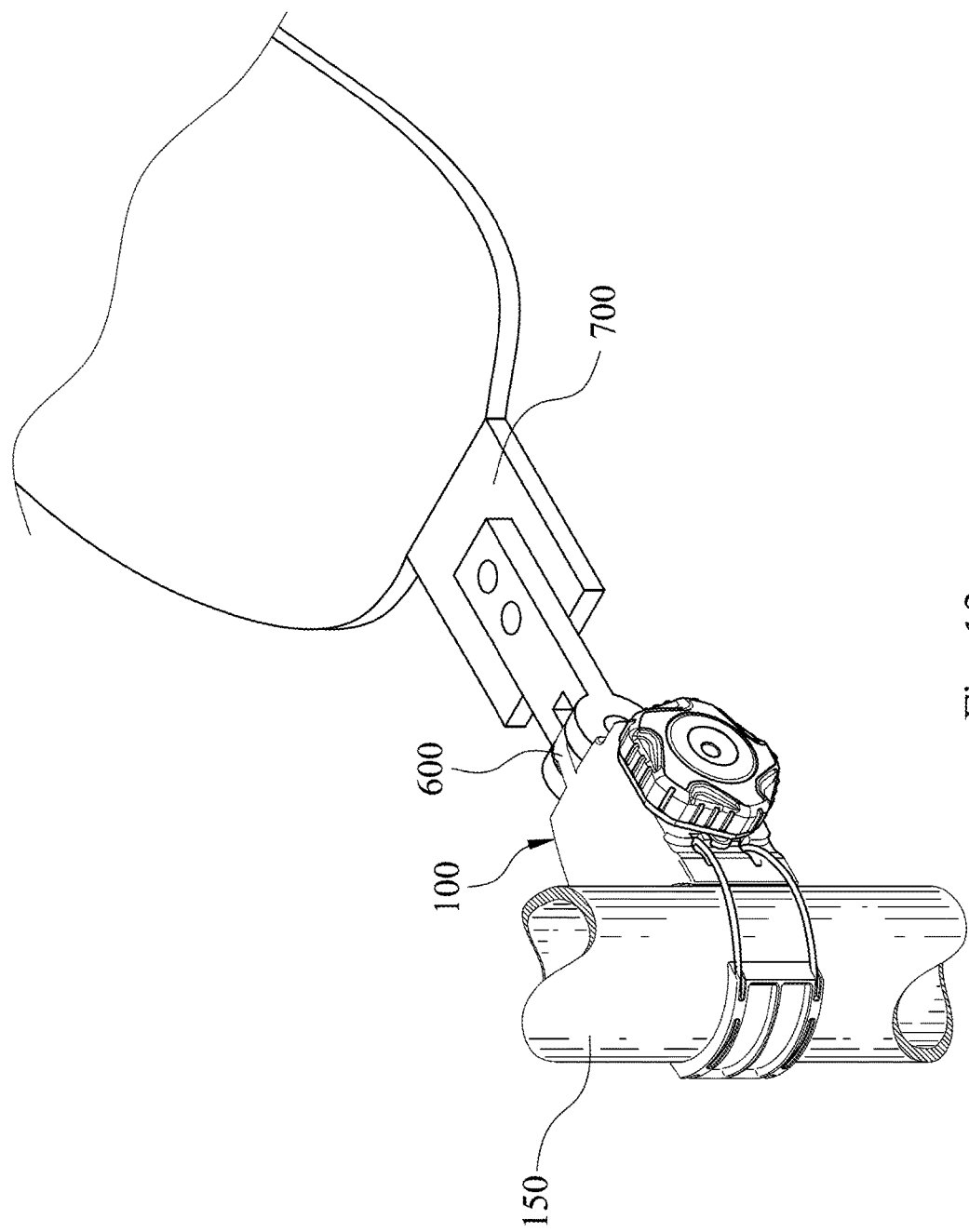
FIG. 12 shows a schematic view of the fixture of FIG. 1 applied on a supporting frame of a bike.

Please refer to FIG. 12. FIG. 12 shows a schematic view of the fixture 100 of FIG. 1 applied on a supporting frame 150 of a bike. As shown in FIG. 12, the connecting unit 600 of the fixture 100 is connected to a fender 700, and the fixture 100 is secured on the supporting frame 150 of the bike. Thus, the fender 700 can be secured on the supporting frame 150 of the bike. Although the fixture of the embodiment is shown as the fixture 100, the fixture 100 can be replaced by other fixtures of the present disclosure or any fixture having the technical features of the present disclosure. In addition, the connecting unit 600 can connect to other article, such as a cup holder, and it will not be limited thereto.

The fixture of the present disclosure has the following advantages.

1. With the arrangement of the main body and the fastening unit, the fixture can be pushed against the target. Because the axis of the adjusting member passes through the main body but not the target, the adjusting stress of the adjusting member, when fastening or loosening the tension member, is more balance. The life time of the fixture can be increased.

2. When the adjusting member includes the spool and the knob, the coupling relationship between the spool and the knob will allow the length of the tension member to be quickly and conveniently adjusted. Furthermore, the lip of the main body can assist the first end portion detachably connecting to the main body.

3. With the structure of the passage which allows the second end portion to be passed through, the first end portion, the fixing portion and the second portion can form a fastening space to correspond to the size of the target. If a through hole which allows the second end portion to be passed through is further disposed at the main body, the second end portion of the tension member is prohibited form exposing. Therefore, the operation will not be effected and other accidence can also be prevented. In addition, with the disposition of the tension member, the fixture can suit target with any shape and the using diversity can be increased.

4. With the disposition of the connecting member, the fixture can connect to different article and the weight of the fixture can be reduced. The using convenience can also be increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fixture, comprising:
   a main body, comprising a passage; and
   a fastening unit disposed at the main body, the fastening unit comprising:
      a tension member, comprising:
         a first end portion detachably connected to the main body;
         a surrounding portion; and
         a second end portion, wherein the surrounding portion is connected between the first end portion and the second end portion, the second end portion is passed through the passage for forming a fastening space surrounded by the first end portion, an outer surface of the main body and the surrounding portion; and an adjusting member disposed at the main body, the adjusting member coupled with the tension member and rotated about an axis relative to the main body such that the second end portion of the tension member wound around a spool of the adjusting member to adjust the fastening space;

wherein the axis about which the adjusting member rotates passes through the main body but not the fastening space.

2. The fixture of claim 1, wherein the adjusting member comprises:

the spool disposed at the main body, the second end portion passed through the passage to connect to the spool; and a knob coupled with the spool;

wherein the knob is rotated along a fastening direction to wind the second end portion around the spool so as to reduce the fastening space, the knob prohibits the second end portion from releasing from the spool in a loosening direction opposite to the fastening direction, and the axis is a central axis of the spool.

3. The fixture of claim 2, wherein the main body further comprises:

a lip, the first end portion detachably connected to the lip.

4. The fixture of claim 3, wherein the main body further comprises:

an arc member connected to the surrounding portion.

5. The fixture of claim 3, wherein the main body further comprises:

a C-shaped member detachably disposed at the main body and connected to the surrounding portion.

6. The fixture of claim 5, wherein the main body further comprises:

a spacer disposed at the C-shaped member.

7. The fixture of claim 1, wherein the adjusting member comprises:

a pressing portion pivotally disposed at the main body via a pivotal rod, the pressing portion having a first position and a second position relative to the main body;

wherein the pressing portion releases the tension member to adjust the fastening space when the pressing portion is rotated to the first position, the pressing portion tenses the tension member to fix the fastening space when the pressing portion is rotated to the second position, and the axis is a central axis of the pivotal rod.

8. The fixture of claim 7, wherein the tension member is a gear bar, and the gear bar comprises a plurality of teeth for pressing by a tooth of the pressing portion.

9. The fixture of claim 8, wherein the main body further comprises:

a through hole located on the main body;

wherein the second end portion passes through the through hole after passing through the passage.

10. A fixture, which is connected to an article and fixes the article to a target, comprising:

a main body, comprising a passage;

a fastening unit disposed at the main body, the fastening unit comprising:

a tension member, comprising:

a first end portion detachably connected to the main body;

a surrounding portion; and a second end portion, wherein the surrounding portion is connected between the first end portion and the second end portion, the second end portion is passed through the passage for forming a fastening space surrounded by the first end portion, an outer surface of the main body and the surrounding portion, the target being surrounded by the first end portion, the outer surface of the main body and the surrounding portion so as to be received in the fastening space; and an adjusting member disposed at the main body, the adjusting member coupled with the tension member and rotated about an axis relative to the main body such that the second end portion of the tension member wound around a spool of the adjusting member to secure the tension member onto the target; and a connecting unit, one end of the connecting unit disposed at the main body, the connecting unit connected to the article, wherein the connecting unit extends in a direction away from the fastening space;

wherein the axis about which the adjusting member rotates passes through the main body but not the fastening space and the target.

11. The fixture of claim 10, wherein the adjusting member comprises:

the spool disposed at the main body, the second end portion passed through the passage to connect to the spool; and a knob coupled with the spool;

wherein the knob is rotated along a fastening direction to wind the second end portion around the spool so as to secure the tension member onto the target, the knob prohibits the second end portion from releasing from the spool in a loosening direction opposite to the fastening direction, and the axis is a central axis of the spool.

12. The fixture of claim 11, wherein a contacting surface between the main body and the knob is substantially a flat surface.

13. The fixture of claim 11, wherein the main body further comprises:

an arc member connected to the surrounding portion.

14. The fixture of claim 11, wherein the main body further comprises:

a C-shaped member detachably disposed at the main body and connected to the surrounding portion.

15. The fixture of claim 10, wherein the adjusting member comprises:

a pressing portion pivotally disposed at the main body via a pivotal rod, the pressing portion having a first position and a second position relative to the main body;

wherein the pressing portion releases the tension member to allow the tension member to correspond to a size of the target when the pressing portion is rotated to the first position, the pressing portion tenses the tension member to secure the main body onto the target when the pressing portion is rotated to the second position, and the axis is a central axis of the pivotal rod.

16. The fixture of claim 15, wherein the main body further comprises:

a through hole located at the main body;

wherein the second end portion passing through the through hole after passing through the passage.

17. A fixture, which is applied on a supporting frame of a bike, comprising:

a main body, comprising a passage, a part of the main body being made of a tough material;
a fastening unit disposed at the main body, the fastening unit comprising:
a tension member, comprising:
a first end portion detachably connected to the main body;
a surrounding portion having two ends, one of the ends of the surrounding portion connected to the first end portion; and
a second end portion, wherein the surrounding portion is connected between the first end portion and the second end portion, the second end portion passed through the passage for forming a fastening space surrounded by the first end portion, an outer surface of the main body and the surrounding portion, the supporting frame of the bike being surrounded by the first end portion, the outer surface of the main body and the surrounding portion so as to be received in the fastening space; and
an adjusting member disposed at the main body, the adjusting member coupled with the tension member and rotated about an axis relative to the main body such that the second end portion of the tension member wound around a spool of the adjusting member to secure the tension member onto the supporting frame of the bike;
wherein the axis about which the adjusting member rotates passes through the main body but not the fastening space and the supporting frame of the bike.

18. The fixture of claim 17, wherein the adjusting member comprises:
the spool disposed at the main body, the second end portion passed through the passage to connect to the spool; and
a knob coupled with the spool;
wherein the knob is rotated along a fastening direction to wind the second end portion around the spool so as to secure the tension member onto the supporting frame of the bike, the knob prohibits the second end portion from releasing from the spool in a loosening direction opposite to the fastening direction, and the axis is a central axis of the spool.

19. The fixture of claim 18, wherein the main body further comprises:
a C-shaped member detachably disposed at the main body and connected to the surrounding portion.

20. The fixture of claim 17, further comprising:
a connecting unit connected to a fender so as to secure the fender on the supporting frame of the bike.

* * * * *